(12) United States Patent
Ruth

(10) Patent No.: US 6,726,107 B1
(45) Date of Patent: Apr. 27, 2004

(54) METHOD AND SYSTEM FOR ACTIVATING A ROADSIDE ASSISTANCE MEMBERSHIP

(75) Inventor: James R. Ruth, Parkland, FL (US)

(73) Assignee: Tracfone Wireless, Inc., Miami, FL (US)

( * ) Notice: Subject to any disclaimer, the term of this patent is extended or adjusted under 35 U.S.C. 154(b) by 34 days.

(21) Appl. No.: 10/121,239

(22) Filed: Apr. 12, 2002

(51) Int. Cl.[7] ............................................. G06K 19/00
(52) U.S. Cl. ................. 235/487; 235/492; 235/375; 235/435; 235/449
(58) Field of Search .................. 235/487, 492, 235/375, 435, 449, 381, 380

(56) References Cited

U.S. PATENT DOCUMENTS 6,199,762 B1 * 3/2001 Hohle ..................... 235/492

* cited by examiner

Primary Examiner—Thien M. Le
Assistant Examiner—Allyson N. Sanders
(74) Attorney, Agent, or Firm—James S. Finn

(57) ABSTRACT

Roadside assistance memberships are sold and activated by offering membership as a retail product. A roadside assistance package is offered as a retail item at a store. The customer pays for the membership at the retail vendor and activates at a later time. One method for activating the roadside assistance memberships is by a customer purchase of a member card for a roadside assistance membership associated with the membership at a retail vendor. The retail vendor then provides an indication of the purchase to a service vendor. The service vendor sets the purchased roadside assistance membership to a state from which it can be activated. The service vendor receives a roadside assistance membership number from a customer. When the roadside assistance membership number is indicated to be ready for activation, as indicated by the retail vendor, the service vendor activates the membership.

21 Claims, 3 Drawing Sheets

METHOD AND SYSTEM FOR ACTIVATING A ROADSIDE ASSISTANCE MEMBERSHIP

FIELD OF THE INVENTION

The present invention relates to roadside assistance memberships, and particularly to selling and activating roadside assistance memberships.

BACKGROUND OF THE INVENTION

Roadside assistance memberships provide aid to members having vehicle malfunctions or other roadside emergencies. For example, some common services performed as part of roadside assistance include towing, battery jump-starts, flat tire changes, fuel delivery, and vehicle lock out assistance. Roadside assistance memberships have traditionally been sold to consumers by a specialized agent associated with a motor club or provider of roadside assistance services. The agent would typically price the roadside assistance membership package in accordance with consumer information and background, such as the number of vehicles covered, past history, etc. Accordingly, the selling of roadside assistance traditionally required specialized vendors.

Roadside assistance memberships have commonly been marketed by first soliciting consumers to contact a roadside assistance vendor by telephone or by mail and, when the consumer contacts the vendor, selling and activating the membership in a single transaction. For example, a motor club agency would offer such services to potential members by direct mail or other advertisement. The agency would then wait for consumers to contact the agency to purchase the roadside assistance membership. The roadside assistance membership would then be sold and activated for the consumer by an agent of the soliciting party.

One problem with this approach is that because the solicitation and actual consummation of the sale are distinct steps, the prior art practices do not facilitate immediate impulse purchases by consumers in response to the solicitation, i.e. the consumer must take the active step of contacting the club in order to purchase the membership. Another problem is that because the sale and activation are performed as a single step, the sale itself often can not be completed until the consumer has all the information necessary to activate the membership. This makes it difficult for one person to purchase the membership for another. For example, a parent might find it difficult to purchase the membership for a child, unless the parent had the necessary information relating to the child.

SUMMARY OF THE INVENTION

The present invention provides a method and system for selling roadside assistance memberships that does not require specialized agents and allows for roadside assistance to be purchased as a retail item. The method includes providing a roadside assistance membership product package at a retail vendor; facilitating the purchase of the roadside assistance membership at the retail vendor; and activating the roadside assistance memberships by interaction between a consumer and a roadside assistance motor club or service vendor.

In one embodiment, the invention provides a method for activating a roadside assistance membership. The method includes providing a roadside assistance membership product package at a retail vendor. The product packaging includes a membership card. The card includes a tracking code and a membership number. The tracking code is transmitted by the retail vendor to the service vendor, preferably substantially at the same time that the customer purchases the roadside assistance membership at the retail vendor. The service vendor receives the tracking code and releases the membership number for activation. In one embodiment, the releasing for activation is by setting the membership number associated with the tracking code to an "active-ready" state. After the sale is complete, the consumer contacts the service vendor to provide the membership number and the consumer's specific membership information relating to the membership. Membership information used to complete the activation preferably includes the member's name and address plus the names of any additional dependents to be covered on the membership as defined in the particular terms of the roadside assistance membership. If the membership number has been released for activation, such as when in the "active-ready" state, the service vendor activates the membership to consummate the roadside assistance membership with the customer.

DETAILED DESCRIPTION OF THE INVENTION

Roadside assistance memberships are sold and activated in accordance with the present invention by a two part process. First, a roadside assistance membership product package is offered for sale as a retail item. The package includes a membership number and a tracking code. The form of the package may vary. For example, the membership number may be printed realtime at the time of the retail sale on a cash register receipt or a card printer at the retail vendor. Simultaneous with the retail sale of the membership product package, is the electronic transfer of the membership number and tracking code from the retail vendor to the service vendor to release the membership number for activation. Second, the consumer that has purchased the roadside assistance package contacts the service vendor to activate the membership. The following discussion provides one example process for facilitating the retail vending of roadside assistance memberships. As may be appreciated, other methods are available for facilitating the retail vending of roadside assistance memberships which are within the scope of the invention.

The retail vendor preferably completes a two step process in offering the roadside assistance package as a retail item. This includes selling a member card, followed by facilitating the activation of the card. In the first step, a retail vendor provides a roadside assistance membership card at a retail vendor. In the second step, the retail vendor preferably facilitates the activation of the card by transmitting the membership number and/or tracking a code to the service vendor.

After the card has been purchased, the customer interacts with the service vendor to activate the membership. The retail vendor and service vendor may be part of the same entity functioning by the two step method to first sell and then activate the roadside assistance membership. Additionally, the service vendor need not be the same entity which performs the roadside assistance service. For example, these services may be contracted out to a third party.

Figure 1:
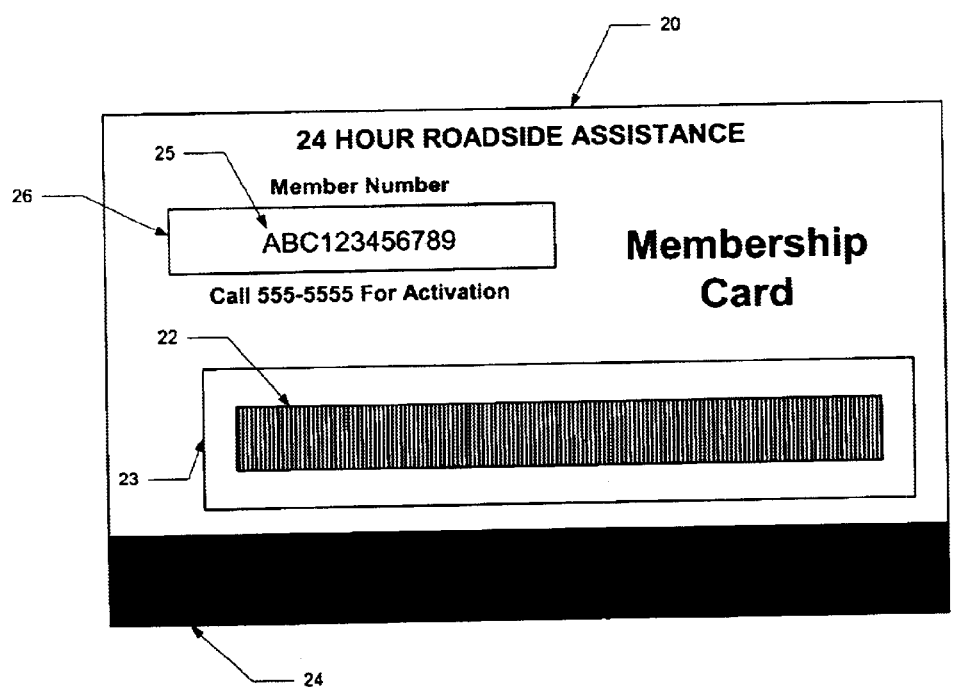
FIG. 1 illustrates a roadside assistance membership card in accordance with the present invention.

FIG. 1 illustrates an embodiment of a roadside assistance membership card, which is preferably offered by the retail vendor as part of the first step of the example method. The roadside assistance membership card 20 is provided within a product packaging (not shown). The product packaging generally includes a UPC (universal product code) bar code (not shown) as is known in the art for indicating a numerical code which is associated with specific product and its purchase price. Preferably, the retail vendor is provided the roadside assistance membership packages at no charge and is advantageously not invoiced for the roadside assistance membership packages until after the membership package has been sold by the retail vendor and made "active ready", thus eliminating inventory costs for the retail vendor. In one embodiment, the product packaging further includes graphics and information (not shown), which are intended to entice a customer to purchase the roadside assistance membership.

The roadside assistance membership card 20 includes a visual membership number portion 26, which allows for reading a unique membership number that identifies the roadside assistance membership number 25. In one embodiment, the roadside assistance membership number portion 26 is covered by a scratch-off shielding material which prevents the reading of the membership number. Preferably, the shielding material may be removed by scratching the surface of the card, such as by a coin or other rigid object. The card 20 also preferably includes a tracking code portion 23, including a tracking code 22. The tracking code 22 is preferably displayed in the form of a visual bar code. Alternatively, or additionally, the membership card 20 includes a magnetic strip portion 24, which allows for magnetically reading the tracking code (not shown) by an electronic card reader, as is known in the art. The tracking code 22 is used by the service vendor to uniquely identify the membership number. The tracking code 22 preferably also allows the retail vendor to identify at least the membership number and the roadside assistance membership associated with the membership card.

Figure 2:
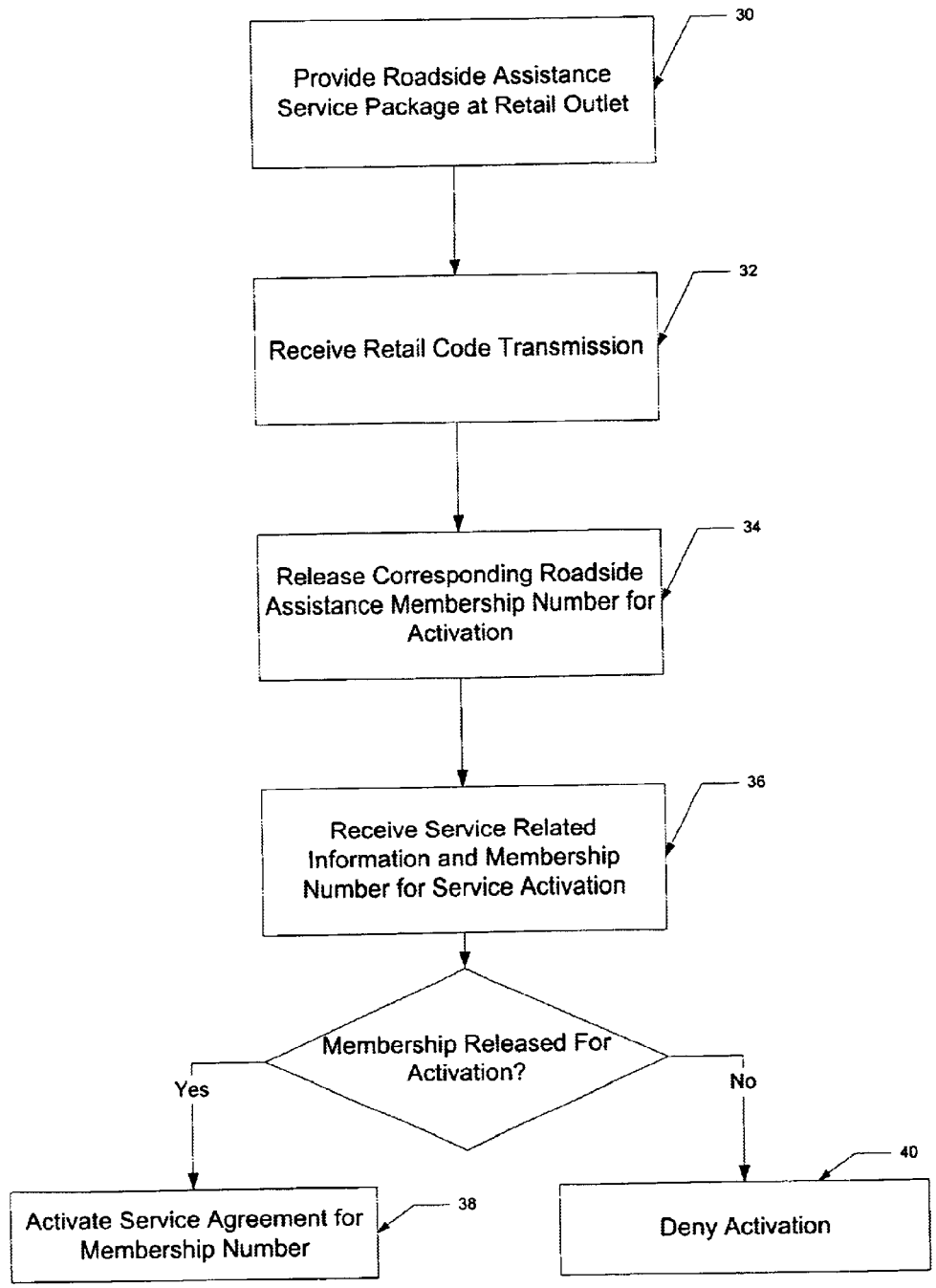
FIG. 2 is a flow diagram illustrating the process for activating a roadside assistance membership in accordance with an embodiment of the invention.

FIG. 2 is a flow diagram illustrating one possible method for activating a roadside assistance membership in accordance with the invention. The method of FIG. 2 includes the retail process and the service process discussed above. During the retail step, a roadside assistance membership package, is provided at a retail vendor (step 30). As discussed above, the roadside assistance membership package includes a roadside assistance membership card 20 (FIG. 1) that carries a tracking code 22 (FIG. 1) and a membership number 25 (FIG. 1). When the customer purchases the roadside assistance membership package, the tracking code 22 is read by the retail vendor by one of several available methods (optical or magnetic) and transmitted to the service vendor. The service vendor receives the tracking code 22 from the retail vendor (step 32). The service vendor associates the tracking code 22 with a roadside assistance membership and a unique roadside assistance membership number and releases the membership number for activation (step 34). In one embodiment, the release for activation is performed by associating the roadside assistance membership number with an "active-ready" state. In one embodiment, the roadside assistance membership number is stored in a computer data record that includes a field indicating whether the membership number is released for activation. In an alternate embodiment, the retail vendor may read the membership number 25 (FIG. 1) directly from the membership number portion 26 (FIG. 1) of the card 20 (FIG. 1). The service vendor receives the membership number 25, verifies the authority of the retail vendor and releases the membership number for activation. After purchasing the roadside assistance membership package, the customer initiates communication with the service vendor. The service vendor receives the membership number 25 (FIG. 1) from the customer and determines whether the membership number is "active-ready". If the membership number is "active-ready", the service vendor prompts the customer for membership information which allows for the activation of the roadside assistance membership, preferably including the member's name and address plus the names of any additional dependents to be covered on the membership as defined in the particular terms of the roadside assistance membership. If the membership number is not released for activation, the activation request is denied (step 40). Preferably, when an activation is denied, it is an indication that the retail transaction was not completed properly. Preferably, the service vendor advises the customer to return the roadside assistance membership package to the retail vendor.

Figure 3:
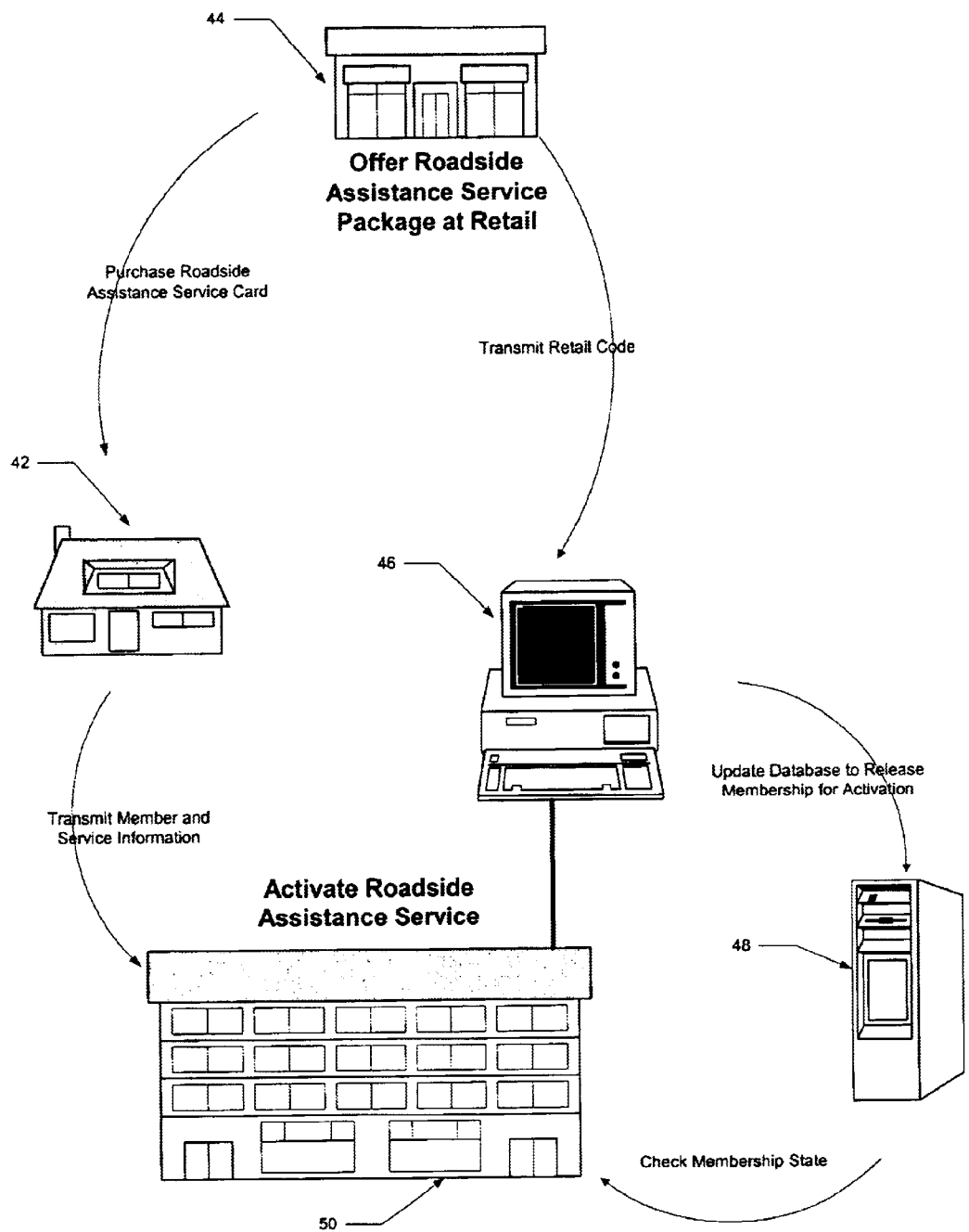
FIG. 3 illustrates an arrangement for facilitating the activation of a roadside assistance membership in accordance with the method of FIG. 2.

FIG. 3 illustrates a preferred information flow for activating a roadside assistance membership in accordance with the invention. A customer 42 purchasing a roadside assistance membership package from a retail vendor 44. The retail vendor 44 reads the tracking code from the roadside assistance membership card after the package has been purchased. The retail vendor 44 transmits the tracking code to a server 46 associated with the service vendor 50. In one embodiment, the server 46 updates a database 48 of the service vendor 50, to indicate that the membership number is released for activation. The customer 42 then establishes communication with the service vendor 50 and transmits the membership number and service information necessary to implement the roadside assistance memberships. The roadside assistance membership vendor 50 receives the information from the customer and proceeds to verify that the membership number for the roadside assistance membership is released for activation. If the membership number is released for activation, service vendor 50 activates the roadside assistance membership and provides a corresponding indication to the customer 42.

In one embodiment the service vendor's 50 interaction with the customer 42 is through an Internet site associated with server 46. The customer 42 interacts with Internet documents to transmit the required information to server 46. Alternatively, the customer 42 and service vendor 50 may interact through other means, such at the telephone. The service vendor server 46 automatically verifies the activation-ready state of the membership number by submitting a query to the database 48.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

What is claimed is:

1. A method for vending roadside assistance memberships, comprising:

offering a roadside assistance membership for sale at retail vendor, wherein the offering a roadside assistance membership comprises, offering a roadside assistance membership card at the retail vendor, the roadside assistance membership card including a retail tracking code and a roadside assistance membership number; and transmitting the membership number to release the membership number for activation to indicate that the roadside assistance membership has been purchased;

receiving an indication from the retail vendor that the roadside assistance membership has been purchased by a customer;

separately from said step of receiving the indication from the retail vendor, receiving an identifier associated with the purchased roadside assistance membership service from the customer; and in response to receiving the indication from the retail vendor and separately receiving said identifier from the customer, activating the roadside assistance membership for the customer.

2. The method of claim 1, wherein said release of the membership number for activation is by setting the roadside assistance membership as "active-ready."

3. The method of claim 1, wherein the identifier associated with the purchased roadside assistance membership service comprises:

the roadside assistance membership number.

4. The method of claim 3, further comprising: receiving service information relating to said roadside assistance from the customer.

5. A method for vending roadside assistance memberships, comprising:

offering a roadside assistance membership for sale at retail vendor, wherein the offering a roadside assistance membership comprises, offering a roadside assistance membership card at the retail vendor, the roadside assistance membership card including a retail tracking code and a roadside assistance membership number;

transmitting the tracking code to release the membership number for activation to indicate that the roadside assistance membership has been purchased receiving an indication from the retail vendor that the roadside assistance membership has been purchased by a customer;

separately from said step of receiving the indication from the retail vendor, receiving an identifier associated with the purchased roadside assistance membership service from the customer; and in response to receiving the indication from the retail vendor and separately receiving said identifier from the customer, activating the roadside assistance membership for the customer.

6. A method for vending roadside assistance memberships, comprising:

offering a roadside assistance membership for sale at retail vendor, wherein the offering a roadside assistance membership comprises, offering a roadside assistance membership at the retail vendor, the retail vendor printing a roadside assistance membership number at the time of purchase of the roadside assistance membership;

receiving an indication from the retail vendor that the roadside assistance membership has been purchased by a customer;

separately from said step of receiving the indication from the retail vendor, receiving an identifier associated with the purchased roadside assistance membership service from the customer; and in response to receiving the indication from the retail vendor and separately receiving said identifier from the customer, activating the roadside assistance membership for the customer.

7. A method of activating roadside assistance membership provided to a customer by a service vendor, the roadside assistance membership sold to the customer by a retail vendor, comprising:

offering a roadside assistance member card for sale by a retail vendor, the card including a retail tracking code adapted to indicate a card purchase and including a membership number associated with the roadside assistance membership offered by the service vendor;

receiving the retail tracking code from the retail vendor to release the membership number for activation;

separately from said step of receiving the indication from the retail vendor, receiving the membership number from the customer;

separately from said step of receiving the indication from the retail vendor, receiving membership information relating to said roadside assistance from the customer; and activating the roadside assistance membership in response to receiving the membership number and the membership information when the membership number is released for activation.

8. The method of claim 7, wherein the member card includes a bar code indicating the retail tracking code.

9. The method of claim 7, wherein the retail tracking code indicates a membership number and a roadside assistance membership identifier.

10. The method of claim 7, wherein the retail tracking code is unique to the member card.

11. The method of claim 7, wherein said receiving the membership number from the customer is by an Internet connection.

12. The method of claim 7, wherein the customer provides membership information by interacting with at least one Internet document.

13. The method of claim 7, wherein the retail tracking code is automatically processed by a server system of the service vendor to release the membership number for activation.

14. The method of claim 7, wherein said membership number is printed on said roadside assistance member card at the time of purchase by the customer of the roadside assistance membership.

15. A system for activating a roadside assistance membership offered by a service vendor, comprising:

a retail vendor, the retail vendor providing a roadside assistance member card to a customer upon the customer's purchase of the roadside assistance membership, the member card including a retail tracking code and a membership number for the roadside assistance membership offered by the service vendor, coupled to a retail vendor, the retail vendor transmitting the membership number and/or tracking code to a service vendor server in response to the customer purchasing the roadside assistance member card; and a service vendor server, the service vendor associated with a membership database, the service vendor server releasing for activation a membership number corresponding to a roadside assistance membership by updating the membership database in response to receiving a retail tracking code corresponding to the membership number and the roadside assistance membership from the retail vendor, the service vendor server accessing membership number status data to determine whether a membership number for a roadside assistance membership is released for activation, the service vendor server receiving separately from receiving said retail tracking code a roadside assistance membership number and associated membership information for a membership from a customer, the service vendor server activating the roadside assistance membership for the customer when the roadside assistance membership number for the roadside assistance membership is released for activation and said membership information is separately received from the customer.

16. The system of claim 15, wherein the member card includes a bar code indicating the retail tracking code.

17. The system of claim 15, wherein the retail tracking code is associated with a membership number and a service.

18. The system of claim 15, wherein the retail tracking code is unique to the member card.

19. The system of claim 15, wherein the retail vendor and the service vendor communicate membership status information by an Internet connection.

20. The system of claim 15, wherein the customer provides membership information to the service vendor by interacting with at least one Internet document.

21. The system of claim 15, wherein the retail tracking code is automatically processed by a server system of the service vendor to release the membership number for activation.

* * * * *